United States Patent Office.

ABRAHAM D. DITMARS, OF LANCASTER, PENNSYLVANIA.

Letters Patent No. 81,149, dated August 18, 1868.

---

IMPROVED MODE OF PREPARING COAL-DUST FOR FUEL.

---

*The Schedule referred to in these Letters Patent and making part of the same.*

---

TO ALL WHOM IT MAY CONCERN:

Be it known that I, ABRAHAM D. DITMARS, of the city of Lancaster, in the county of Lancaster, and State of Pennsylvania, have invented a new and improved Mode of Preparing Coal-Dust as an Article of Fuel; and I do hereby declare that the following is a full and exact description thereof.

The object of my invention is to utilize or to prepare and make available the coal-dust that accumulates about coal-mines and coal-yards, in such a manner that it will burn readily and radiate the most intense heat from an ordinary coal-stove.

The nature of my invention consists in the employment or use of water, with a proper proportion of flour of sulphur incorporated with the coal-dust, sufficient to bring the whole to a semi-plastic state or to the consistency of common stone-masons' mortar.

The advantages of my invention are obvious, for the reason that immense quantities of coal-dust accumulate in and about yards and mines, and it becomes cumbersome and in the way, so much so that it is expensive to cart or remove the same to some less objectionable locality.

By my invention, the coal-dust and the smaller particles of coal are perfectly utilized and made available for fuel at a mere nominal cost, thereby making a large amount of fuel which the poorer classes may avail themselves of.

The advantages of my invention are evident, for the reason that no moulding-machinery is required for its preparation, which renders it more available and cheaper than by any other known process.

I am fully aware that various ingredients have been mixed with coal-dust, for the purpose of utilizing the same, but all have been attended with so much trouble and expense as to render them impracticable and useless.

To enable others skilled in the art to make and use my invention, I will proceed to describe the process by which I utilize coal-dust.

To an ordinary scuttleful of coal-dust, I mix one-quarter of an ounce of flour of sulphur. After the sulphur is well mixed with the coal-dust, I add water enough to bring it to the consistency of common lime-mortar, as used for laying stone, when it is ready for use. So it is thus prepared from day to day, and from time to time, as it is required for use.

To make a fire with coal-dust, after my process for preparing the same, it is only necessary to kindle first with wood and put on a small quantity of ordinary stove-coal, and when it gets well on fire, the preparation of coal-dust may be added, when the whole will burn with the most intense heat.

I will here observe that care must be taken to regulate the draught of the stove, by means of dampers or otherwise, or else the strongest stove will be liable to melt down and be destroyed.

I do not confine myself to the exact proportions of materials described or set forth, as they may be varied without materially affecting the result or utility of my invention.

Having thus described my invention, what I claim, and desire to secure by Letters Patent of the United States, is—

Preparing coal-dust for fuel, substantially as herein shown and described, and for the purposes set forth.

A. D. DITMARS.

Witnesses:
 JOHN S. THORNTON,
 J. C. LAURENCE.